United States Patent Office 2,734,845
Patented Feb. 14, 1956

2,734,845

AQUEOUS SUSPENSION OF PROCAINE PENICILLIN AND ACID SALT OF ANTIHISTAMINE

Klaus Bauer and Ernst Auhagen, Wuppertal-Elberfeld, Germany, assignors to Schenley Industries, Inc., New York, N. Y., a corporation of Delaware No Drawing. Application February 4, 1952,
Serial No. 269,901

Claims priority, application Germany February 8, 1951

6 Claims. (Cl. 167—65)

This invention relates generally to penicillin-containing compositions and, more particularly, it is concerned with certain novel, free-flowing aqueous suspensions of a water-insoluble penicillin salt, present in the suspensions in an unusually large proportion.

It is known that water-insoluble salts of penicillin can be suspended in aqueous media in minor concentrations sufficient, however, for certain therapeutic purposes. For instance, an aqueous suspension comprising about ten per cent by weight of finely ground procaine penicillin can be readily prepared and has sufficient fluidity to suit it for administration by injection. Heretofore, attempts to produce suspensions in aqueous media, containing higher concentrations of the insoluble penicillin salt have resulted in suspensions that are insufficiently fluid and too pasty for administration by injection.

It has been proposed to prepare procaine penicillin suspensions having high concentrations of the antibiotic agent through use of an alkali salt of penicillin in the procaine penicillin suspension and such suspensions have sufficient fluidity for injection purposes, even when the procaine salt is present to the extent of about fifty per cent by weight of the mixture. However, suspensions of this type lose their activity, at least partially, when stored, due to decomposition of the alkali penicillin salt when in solution, and it has been necessary, therefore, when using suspensions of this type, to prepare the suspension freshly in each instance, immediately before it is to be administered.

An object of this invention is to provide stable aqueous suspensions of water-insoluble penicillin salts that contain a major proportion of one or more of these salts, which are stable upon storage and which have sufficient fluidity to suit them to administration by injection.

In accordance with this invention, stable aqueous suspensions containing a higher concentration of a finely divided water-insoluble penicillin salt are provided by dissolving in the aqueous medium a salt of an alkylenediamine base as hereinafter specified.

The compositions of this invention are suspensions of a substantially water-insoluble salt of penicillin, preferably the procaine salt of penicillin, in an aqueous solution of a salt of a histamine-antagonizing alkylenediamine base of the general formula:

$$R.X.N\diagup^{R_1}_{R_2}$$

wherein R is a group, linked to the remainder of the molecule through a nitrogen atom, comprised of at least two cyclic groups, which may be homocyclic or heterocyclic, or their equivalent in a polycyclic system, having a minimum aggregate molecular weight of 150; X is an alkylene group having 2 or 3 carbon atoms in the chain linking R to the nitrogen atom; and $R_1$ and $R_2$ are alkyl groups or together constitute, with the nitrogen atom to which they are linked, a polymethyleneimino group.

Among the salts of histamine-antagonizing alkylenediamine bases that may be utilized in the compositions of this invention are the common mineral or simple organic carboxylic acid salts, such as the sulfates, the hydrochlorides, acetates, succinates, maleates, etc., of the following free bases:

(1) Compounds of the formula:

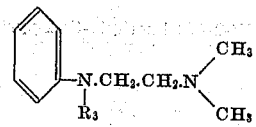

wherein $R_3$ is

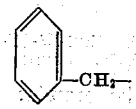

(Antergan base: N:N-dimethyl-N'-phenyl-N'-benzyl-ethylenediamine)

or

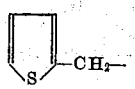

(Diatrin base: N:N-dimethyl-N'-phenyl-N'-(2-thenyl)-ethylenediamine)

(2) Compounds of the formula:

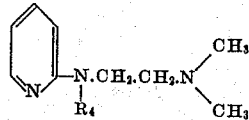

wherein $R_4$ is

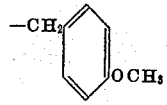

(Neoantergan base: N:N-dimethyl-N'-(4-methoxybenzyl)-N'-(2-pyridyl)-ethylenediamine)

or

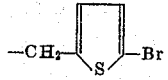

(Bromothen base: N:N-dimethyl-N'-(2-pyridyl)-N'-(5-bromothenyl-2)-ethylenediamine)

or

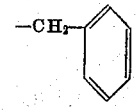

(Pyribenzamine base: N: N-dimethyl-N'-(2-pyridyl)-N'-benzyl-ethylenediamine)

or

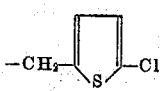

(Tagathen base: N:N-dimethyl-N'-(2-pyridyl)-N'-(5-chlorothenyl-2)-ethylenediamine)

or

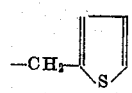

(Histadyl base: N:N-dimethyl-N'-(thenyl-2)-N'-(2-pyridyl)-ethylenediamine)

or

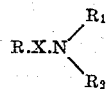

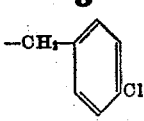

(Synopen base: N:N-dimethyl-N'-(4-chloro-benzyl)-N'-(2-pyridyl)-ethylenediamine)

or

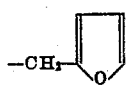

(N-N-dimethyl-(N'-2-furylmethyl)-N'-2-pyridyl-ethylenediamine)

or

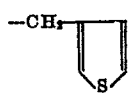

(Thenfadil base: N:N-dimethyl-N'-(thenyl-3)-N'-(2-pyridyl)-ethylenediamine)

(3) Compounds of the formula:

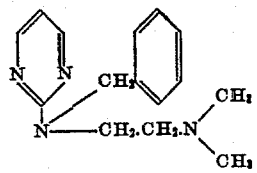

(Hetramine base: N:N-dimethyl-N'-benzyl-N'-(2-pyrimidyl)-ethylenediamine)

or

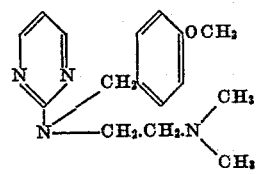

(Neohetramine base: N:N-dimethyl-N'-(4-methoxy-benzyl)-N'-(2-pyrimidyl)-ethylenediamine)

or

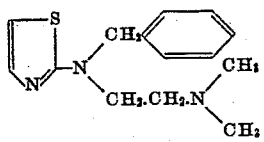

(N:N-dimethyl-N'-(thiazolyl-2)-N'-benzyl-ethylenediamine)

or

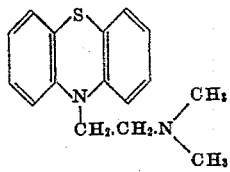

(Compound RP 3015 base: 10-(β-dimethylamino-ethyl)-phenothiazine)

or

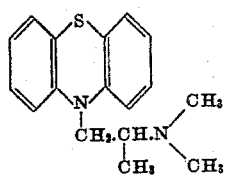

(Phenergan base: 10-(β-dimethylamino-propyl-1')-phenothiazine)

or

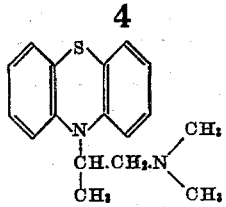

(Compound RP 3389 base: (10-(β-dimethylamino-propyl-2')-phenothiazine)

or

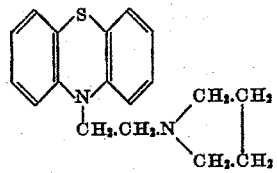

(Pyrrolazote base: 10-[β-(1-pyrrolidyl)ethyl]-phenothiazine)

or

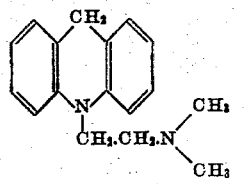

(10-(β-dimethylaminoethyl)-dihydroacridine)

The penicillin salt suspensions according to this invention may be prepared by grinding together the water-insoluble penicillin salt and the alkylenediamine salt, then adding the mixture to water. Alternatively, the water-insoluble penicillin salt may be ground and then suspended in a previously prepared aqueous solution of the alkylenediamine salt or the alkylenediamine salt, in dry state, may be added to an aqueous slurry of the penicillin salt. In each instance a stable suspension is obtained having satisfactory fluid characteristics suiting it for parenteral administration by means of a hypodermic syringe.

While the proportions of the components of the suspension are not critical, the alkylenediamine salt should be present in the aqueous mixture in a concentration of five to ten per cent by weight, the proportion being dependent upon the particle size of the water-insoluble penicillin salt being incorporated in the suspension.

A novel property of the penicillin salt suspensions according to this invention is that they do not foam when shaken, thus facilitating charging of the injection syringe without observing special precautions to avoid drawing in air bubbles that it would be difficult subsequently to discharge without loss of the medicament.

To facilitate a better understanding of the subject matter of this invention, two specific examples herewith follow. It is clearly to be understood that these examples are provided by way of illustration merely and are not to be construed as limitations upon the scope of this invention. The specific histamine-antagonizing agents referred to in these examples may, of course, be replaced by any of the histamine-antagonizing agents above mentioned and the products obtained under these circumstances are comparable to those that will now be described.

*Example 1*

About 1 part by weight of the procaine salt of penicillin is mixed with about 2 parts by weight of water and 0.2 part by weight of 10-[(2'-dimethylamino)-n-propyl]-phenothiazine hydrochloride is added to the pasty mass. A fluid suspension, suitable for parenterial administration by injection, is obtained. The suspension is unusually stable when stored under ordinary conditions, especially after the addition of viscosity-modifying colloids, such as sodium carboxymethyl cellulose or the like, and buffer substances conventionally included in procaine penicillin suspensions.

Example 2

Approximately 1 part by weight of the procaine salt of penicillin is suspended in about 2 parts by weight of a 7% aqueous solution of the acid maleate of N'-(4-methoxybenzyl)-N'-(2-pyridyl) - N - N - dimethyl-ethylenediamine. A stable fluid suspension suitable for administration by injection is thus obtained.

Although the histamine-antagonizing agent in the novel penicillin salt suspensions according to this invention serves to make the suspensions of a fluidity suiting them for administration by injection, a secondary property due to the presence of this agent is that it reduces the sensitivity of the patient in instances where penicillin sensitivity may be present. This is a factor of substantial importance inasmuch as penicillin sensitivity, or at least a reaction of pencillin, in varying degrees, may be observed in as much as 10% of an average group of human patients.

Having thus described the subject matter of this invention, what it is desired to secure by Letters Patent is:

1. An aqueous suspension of the procaine salt of penicillin characterized by improved fluidity, wherein the proportion of the salt present, based on total weight, materially exceeds about 10 per cent, that comprises additionally from about 5 to 10 per cent by weight of a salt of a histamine-antagonistic alkylenediamine represented by the formula:

R.X.Z wherein R is a group, comprising and linked to the remainder of the molecule through a nitrogen atom, comprised of at least two cyclic groups, having a minimum aggregate molecular weight of 150; X is an alkylene group having at least 2 and at most 3 carbon atoms in the chain linking R with the remainder of the molecule; and Z is a group comprising a nitrogen atom, through which it is linked to the remainder of the molecule, chosen from the group consisting of dimethylamino and pyrrolidyl.

2. An aqueous suspension comprised of finely divided particles of the procaine salt of penicillin wherein the proportion of the salt present, based on total weight, materially exceeds about 10 per cent, and characterized by improved fluidity, that comprises additionally from about 5–10 per cent by weight of a salt of a histamine-antagonistic alkylenediamine represented by the formula:

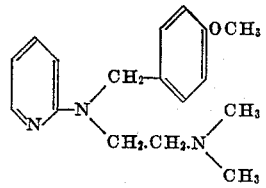

3. An aqueous suspension comprised of finely divided particles of the procaine salt of penicillin wherein the proportion of the salt present, based on total weight, materially exceeds about 10 per cent, and characterized by improved fluidity, that comprises additionally from about 5–10 per cent by weight of a salt of a histamine-antagonistic alkylenediamine represented by the formula:

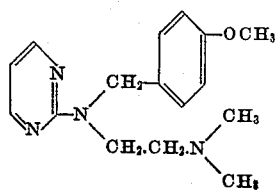

4. An aqueous suspension comprised of finely divided particles of the procaine salt of penicillin wherein the proportion of the salt present, based on total weight, materially exceeds about 10 per cent, and characterized by improved fluidity, that comprises additionally from about 5–10 per cent by weight of a salt of a histamine-antagonistic alkylenediamine represented by the formula:

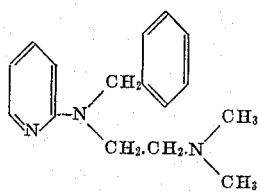

5. An aqueous suspension comprised of finely divided particles of the procaine salt of penicillin wherein the proportion of the salt present, based on total weight, materially exceeds about 10 per cent, and characterized by improved fluidity, that comprises additionally from about 5–10 per cent by weight of a salt of a histamine-antagonistic alkylenediamine represented by the formula:

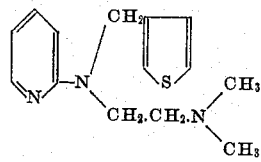

6. An aqueous suspension comprised of finely divided particles of the procaine salt of penicillin wherein the proportion of the salt present, based on total weight, materially exceeds about 10 per cent, and characterized by improved fluidity, that comprises additionally from about 5–10 per cent by weight of a salt of a histamine-antagonistic alkylenediamine represented by the formula:

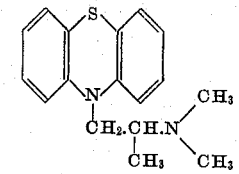

References Cited in the file of this patent

UNITED STATES PATENTS

| | | |
|---|---|---|
| 2,470,296 | Fields | May 17, 1949 |
| 2,569,666 | Granatek | Oct. 2, 1951 |
| 2,579,185 | Granatek | Dec. 18, 1951 |
| 2,585,239 | Granatek | Feb. 12, 1952 |
| 2,619,447 | Malcolm et al. | Nov. 25, 1952 |
| 2,627,491 | Szabo | Feb. 3, 1953 |
| 2,637,679 | Gaunt et al. | May 5, 1953 |
| 2,656,299 | Elias et al. | Oct. 20, 1953 |

FOREIGN PATENTS

| | | |
|---|---|---|
| 658,467 | Great Britain | Oct. 10, 1951 |

OTHER REFERENCES

Simon: "Hypo-Allergic Penicillin," Annals of Surgery, vol. 8, No. 2, March–April, 1950, pp. 194–201, esp. at p. 200.

Leonard et al.: "Histamine Antagonists," Review No. 3, Chemical-Biological Coordination Center, National Research Council, Wash., D. C., 1950, 122 pp., particularly pp. 3–5.

Chemical Reviews, "Antihistamine Drugs," December 1950, vol. 47, No. 3, esp. pp. 491 (RP 3277) and 493 (No. 5, Phenergan, base and salts).